US011966380B2

(12) United States Patent
Tschudin et al.

(10) Patent No.: US 11,966,380 B2
(45) Date of Patent: *Apr. 23, 2024

(54) SECURE INFORMATION RETRIEVAL AND UPDATE

(71) Applicant: SYMPHONY COMMUNICATION SERVICES HOLDINGS LLC, Palo Alto, CA (US)

(72) Inventors: Christian Tschudin, Basel (CH); David M'Raihi, San Carlos, CA (US)

(73) Assignee: SYMPHONY COMMUNICATION SERVICES HOLDINGS LLC, Palo Alto, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 17/381,916

(22) Filed: Jul. 21, 2021

(65) Prior Publication Data

US 2022/0012228 A1 Jan. 13, 2022

Related U.S. Application Data

(63) Continuation of application No. 16/683,780, filed on Nov. 14, 2019, now Pat. No. 11,100,082, which is a (Continued)

(51) Int. Cl.

*G06F 21/62* (2013.01)
*G06F 16/23* (2019.01)

(Continued)

(52) U.S. Cl.

CPC ........ *G06F 16/2358* (2019.01); *G06F 16/244* (2019.01); *G06F 21/6227* (2013.01);

(Continued)

(58) Field of Classification Search

CPC ............... G06F 21/602; G06F 21/6227; G06F 21/6218; G06F 2221/2107; G06F 21/6245;

(Continued)

(56) References Cited

U.S. PATENT DOCUMENTS 5,751,856 A 5/1998 Hirabayashi
5,963,642 A 10/1999 Goldstein (Continued)

FOREIGN PATENT DOCUMENTS

WO WO-2014118257 A1 * 8/2014 ............. H04L 9/304

OTHER PUBLICATIONS

Chandran, N. et al., "Public-Key Encryption with Efficient Amortized Updates," In Garay, J.A. et al.(eds.), Proceedings Security and Cryptography for Networks: 7th International Conference, Amalfi, Italy, Springer, Sep. 2010, pp. 17-35.

(Continued)

*Primary Examiner* — Badri Narayanan Champakesan
(74) *Attorney, Agent, or Firm* — Goodwin Procter LLP

(57) ABSTRACT

A secure storage module of a client device interacts with a set of secure storage servers to securely store data items of the client on the servers, such that no individual server has the data in readable (non-obfuscated) form. Additionally, the client secure storage module and the servers interact to allow the client device to read a given portion of the original data items from the servers, such that none of the servers can determine which portion of the original data is being requested. Similarly, the interactions of the client secure storage module and the servers allows the client device to update a given portion of the original data on the servers to a new value, such that none of the servers can determine which portion is being updated and that none of the servers (Continued)

Client Device 120A
Secure storage 124
Network 140
Client Device 120B
Secure storage 124
Secure Storage Server 101_1
...
Secure Storage Server 101_N can determine either the prior value or new value or the difference between the new value and the prior value.

18 Claims, 8 Drawing Sheets

Related U.S. Application Data continuation of application No. 15/456,436, filed on Mar. 10, 2017, now Pat. No. 10,496,631.

(51) Int. Cl.
*G06F 16/242* (2019.01)
*G06F 16/27* (2019.01)
*H04L 9/08* (2006.01)
*H04L 29/08* (2006.01)
*H04L 67/1097* (2022.01)
*H04L 67/1095* (2022.01)

(52) U.S. Cl.
CPC ...... *G06F 21/6254* (2013.01); *G06F 21/6263* (2013.01); *H04L 9/0891* (2013.01); *H04L 9/0894* (2013.01); *H04L 67/1097* (2013.01); *G06F 16/278* (2019.01); *H04L 67/1095* (2013.01)

(58) Field of Classification Search
CPC ..... G06F 21/6209; G06F 21/00; H04L 9/008; H04L 9/0618; H04L 63/0428; H04L 9/0894; H04L 9/002; H04L 9/085; H04L 2209/46; H04L 9/0869; H04L 9/3093; H04L 2209/04; H04L 9/00; H04L 63/0478; H04L 9/3026; H04L 9/3066; H04L 9/3218; H04L 9/304; H04L 9/3006
USPC .......................................................... 707/625
See application file for complete search history.

(56) References Cited

U.S. PATENT DOCUMENTS 5,991,414 A * 11/1999 Garay ..................... H04L 9/302 380/30
6,289,335 B1 * 9/2001 Downing ............ G06F 16/2393 707/769
6,571,313 B1 5/2003 Filippi et al.
7,093,137 B1 * 8/2006 Sato .................... G06F 21/6227 380/277
7,770,029 B2 * 8/2010 Venkatesan ......... G06F 12/1416 713/193
8,904,171 B2 * 12/2014 Clifton .................. G06F 16/334 713/167
9,021,259 B2 * 4/2015 Furukawa ........... G06F 21/6227 713/165
9,667,379 B2 * 5/2017 Cronie .................. H04L 1/0057
10,181,049 B1 * 1/2019 El Defrawy ........ G06F 21/6227
10,346,737 B1 7/2019 Benitez et al.
10,496,631 B2 * 12/2019 Tschudin .............. H04L 9/0891
2006/0053112 A1 * 3/2006 Chitkara ............. G06F 21/6227
2006/0177067 A1 * 8/2006 Kim ...................... H04L 9/0836 380/278
2006/0227974 A1 * 10/2006 Haraszti ................ H04L 9/0662 380/280
2008/0065665 A1 * 3/2008 Pomroy .............. G06F 21/6245
2009/0136033 A1 * 5/2009 Sy ........................... H04L 9/008 380/255
2010/0091986 A1 * 4/2010 Wakayama ........... H04L 9/0869 380/44
2010/0269008 A1 * 10/2010 Leggette ................. G06F 21/78 714/752
2011/0060917 A1 * 3/2011 Troncoso Pastoriza ..................... G06F 21/76 713/189
2011/0191584 A1 * 8/2011 Trostle ...................... H04L 9/00 713/165
2012/0300992 A1 11/2012 Ivanov et al.
2013/0010953 A1 * 1/2013 Seurin ..................... H04L 9/085 380/255
2013/0159731 A1 * 6/2013 Furukawa ................. H04L 9/14 713/189
2014/0105385 A1 * 4/2014 Rane ..................... H04L 9/0819 380/30
2014/0344944 A1 * 11/2014 Olumofin ............ G06F 21/6245 726/26
2015/0143112 A1 * 5/2015 Yavuz ....................... H04L 9/00 713/165
2015/0357047 A1 * 12/2015 Tiwari .................. G06F 9/3877 714/719
2016/0078079 A1 3/2016 Hu et al.
2016/0119119 A1 * 4/2016 Calapodescu ....... G06F 21/6227 380/30
2016/0170996 A1 6/2016 Frank et al.
2016/0188250 A1 6/2016 Wheeler
2016/0253514 A1 * 9/2016 Wu ........................ G06F 19/00 726/30
2016/0335281 A1 * 11/2016 Teodorescu ......... G06F 12/1483
2016/0335450 A1 11/2016 Yoshino et al.
2017/0169079 A1 * 6/2017 Monni .................. G06F 16/955
2017/0257357 A1 9/2017 Wang et al.
2017/0277433 A1 * 9/2017 Willcock ............ G11C 7/1006
2018/0081767 A1 3/2018 He et al.
2018/0253562 A1 * 9/2018 Antonatos ........... G06F 21/6218
2018/0260430 A1 * 9/2018 Tschudin ............ G06F 16/2358
2018/0337899 A1 * 11/2018 Becker .................. H04L 9/0852
2019/0065312 A1 * 2/2019 Dhuse ..................... G06F 3/064
2019/0156051 A1 * 5/2019 Beier .................. G06F 21/6236
2019/0205568 A1 * 7/2019 Veugen ................... G06F 7/723
2019/0340381 A1 * 11/2019 Yavuz ....................... H04L 9/00
2020/0142881 A1 * 5/2020 Tschudin .............. G06F 16/244

OTHER PUBLICATIONS

Chor, B. et al., "Private Information Retrieval," Journal of the ACM, Nov. 1998, pp. 965-981, vol. 45, No. 6.
Devet, C. et al. "Optimally Robust Private Information Retrieval," In Proceedings of the 21st USENIX Conference on Security Symposium, Security'12, Berkeley, CA, USA, USENIX Association, 2012, pp. 269-283.
European Extended Search Report, European Application No. 18160514.8, dated Jul. 30, 2018, 12 pages.
Fanti, G. C. et al., "Efficient Private Information Retrieval Over Unsynchronized Databases," IEEE Journal on Selected Topics Signal Processing, Oct. 2015, pp. 1229-1239, vol. 9, No. 7.
Lipmaa, H. et al., "Two New Efficient PIR-Writing Protocols," In Proceedings Applied Cryptography and Network Security, 8th International Conference, ACNS 2010, Beijing, China, Jun. 22-25, 2010, pp. 438-455.
Wang, C. et al., "Toward Secure and Dependable Storage Services in Cloud Computing," IEEE Transactions on Services Computing, IEEE, Apr.-Jun. 2012, pp. 220-232, vol. 5, No. 2.

* cited by examiner

SECURE INFORMATION RETRIEVAL AND UPDATE

CROSS-REFERENCE TO RELATED APPLICATIONS

This application is a continuation of U.S. patent application Ser. No. 16/683,780, filed Nov. 14, 2019, which is a continuation of U.S. patent application Ser. No. 15/456,436, filed Mar. 10, 2017, the entire contents of each of which are incorporated by reference herein.

TECHNICAL FIELD

The disclosed embodiments relate generally to computer communications and, more specifically, to providing secure access to confidential information stored within a server cloud.

BACKGROUND

Users often communicate with each other over the Internet, and store network-based data, in an unsecure manner. Unsecure communications and data are acceptable for many purposes where the information communicated is of a non-sensitive nature.

However, there are many contexts in which the information communicated is actually or potentially sensitive, such as when communicating and storing confidential business details, conducting e-commerce, and the like. In such contexts, the communicating users should employ systems with cryptographic capabilities that can encrypt and decrypt the communicated information. This prevents intermediate parties such as active eavesdroppers, systems such as routers that make up the Internet architecture, and the systems storing data at remote locations, from being able to obtain the communicated information in its original plaintext form.

The cryptographic infrastructure needed to allow users to easily and transparently secure their communications can be complex. Delegation of cryptographic functionality entails a certain degree of trust of the infrastructure components that provide the functionality. Accordingly, a third-party organization providing the cryptographic functionality may be able to exploit this trust to obtain the original, unencrypted communications. Such a risk may not be acceptable to some users, e.g., when conducting highly sensitive communications.

More specifically, although information is communicated and stored in encrypted form, the mere fact of selecting among several encrypted items in a database may reveal sensitive information. The request which expresses such a selection must therefore be encrypted, as well. While this protects against eavesdroppers on the network, the request itself cannot easily be hidden from the server responding to the query or update request: Human operators of the cloud infrastructure could, for example, gain access to the server's internal memory where the request is decrypted and represented in unencrypted form, and/or to the new content that is to be stored in encrypted form in the cloud.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
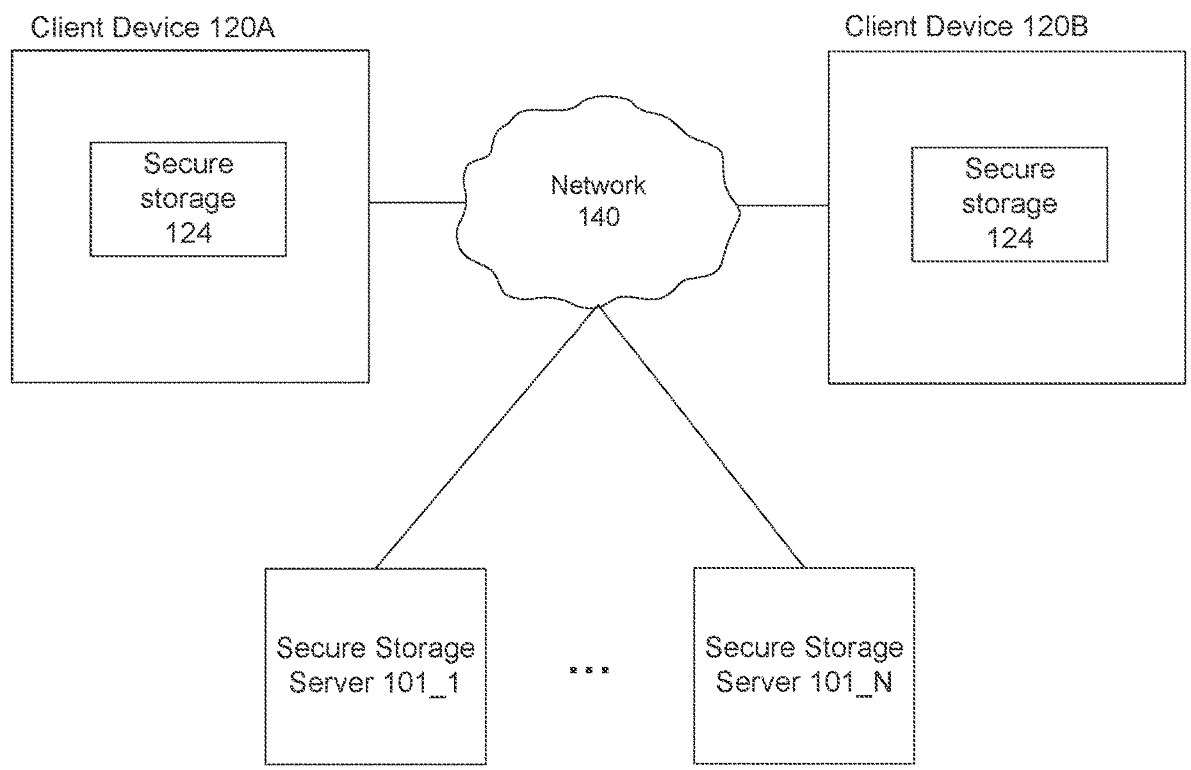
FIG. 1 shows a system environment in which secure communications takes place, according to one embodiment.

FIG. 1 shows a system environment in which secure storage and secure communication take place, according to one embodiment. Users of an organization that wishes to use secure cloud-based (server-based) storage use services of a secure communications infrastructure. The items of data to be securely stored may include (for example) computer source code, confidential business information, trade secrets, images, and/or any other type of client data items for which user privacy and security are desired. The secure communications infrastructure is implemented by the interactions of a secure storage module 124 installed on client devices 120 and a set of secure storage servers 101. The interactions of the secure storage module 124 of a client device 120 and the secure storage servers 101, and the distribution of portions of client data across a server cloud of the various servers 101, permit the client device to store its items of data (e.g., as stored in a file containing any type of data) across the servers 101 such that no individual server 101 can determine the original client data being stored. Further, due to the way in which query information is distributed across the servers 101, the client device 120 can read individual portions of the data items—each portion being distributed across the multiple servers 101—without any of the servers 101 being able to determine which portion is being read. Still further, the client device 120 can update individual portions of the data items without any of the servers being able to determine which portion is being updated, or even to be able to determine what new value is being written to the portion being updated. (These distribution, read, and update operations that do not disclose information to servers, eavesdroppers, or the like can be referred to collectively as privacy-preserving data operations.) The update operations can also be achieved with a single set of parallel request-response operations between the client device 120 and the servers 101, rather than requiring multiple rounds of requests and responses. The privacy-preserving data operations are information theoretically secure, rather than merely computationally secure, in that those with access to the individual servers, eavesdroppers, or others attempting to obtain the information lack sufficient information to do so, and thus cannot break the system, even with unlimited computing power, assuming that the original data is properly encrypted so that it cannot be read while in transport.

The client devices 120 and the secure storage servers 101 communicate with each other through a network 140. The network may be any suitable communications network for data transmission. In one embodiment, the network 140 is the Internet and uses standard communications technologies and/or protocols.

It should be understood that although for simplicity FIG. 1 depicts only two client devices 120 for the multiple secure storage servers 101, there may be any number of client devices and secure storage servers. It should also be understood that the client device 120 may be any computer system (also referred to as a "source computer") that is a source of data to be securely stored and updated and that uses the servers 101 to facilitate the privacy-preserving data operations.

Figure 2A:
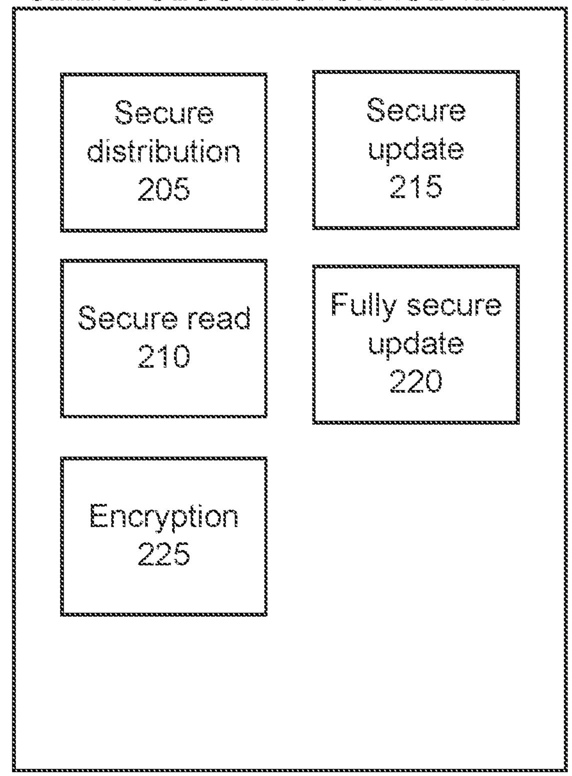
FIGS. 2A and 2B respectively illustrate components of the client secure storage modules and of the secure storage servers, according to one embodiment.
Figure 2B:
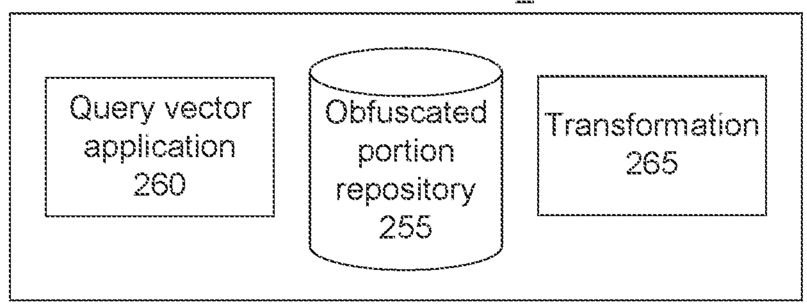

FIGS. 2A and 2B respectively illustrate components of the secure storage modules 124 of the client devices 120 and of the secure storage servers 101, according to one embodiment. Together, the secure storage modules 124 and the secure storage servers 101 implement secure storage functionality that allows users of client devices 120 to store, read, and update data items (also referred to simply as "data") stored on the servers 101 such that the stores, reads, and updates do not reveal information to the servers 101 or to eavesdroppers or other parties on the network 140. (The term "securely access" is used hereinafter to denote performing a secure data operation such as storing, reading, or updating of the data items that is privacy-preserving and keeps data confidential at all times.)

In brief, the secure storage module 124 divides the data across the different, non-colluding secure storage servers 101, combining the different portions of the divided data with random values in such a manner that the divided and obfuscated portions of the divided data can also be read and updated separately on the various servers 101, without the client device 120 needing to obtain the original data in its entirety. This provides greater efficiency relative to operating on the data as a whole, both with respect to computation and with respect to network data transfer, in that only subsets of the data need be transformed and transmitted. The nature of the data distribution and transformation techniques permit the client device to derive the data in its original form, given the various transformed portions of the divided data stored by the various servers 101. Only a single "round-trip" (set of parallel requests from a client device 120 to the set of secure storage servers 101, and reply from the set of secure storage servers 101 to the client device) is required for a read of a particular data portion, and only a single round-trip is needed for a secure update (see FIG. 3C) if a client device already knows the value of the data portion to be updated (which it can achieve with a read). The distribution of the data across multiple servers 101 also prevents any given server (or eavesdropper on the server's network) from obtaining information such as which portion of the data is being read or updated.

The secure storage servers 101 form a non-colluding server cloud. The servers 101 are designed not to communicate with each other to combine the divided data, which could result in obtaining the original unencrypted data. Additionally, to further lessen the danger of collusion, the various secure storage servers 101 can be operated by different organizations, so that an employee of one organization gaining access to the data in one of the secure storage servers would not allow access to data in other secure storage servers.

The secure storage module 124 comprises a secure distribution module 205 that securely distributes data of the client device 120 to the secure storage servers 101 in an obfuscated manner such that none of the servers 101 has the ability to infer the original value of the data, and such that the client devices can read and update portions of the data in an efficient manner. For purposes of explanation, the data of a client device 120 is hereinafter denoted C (denoting "content"), and the $i^{th}$ secure storage server is denoted $S_i$. Content C may be processed in sub-portions. In the embodiment described hereafter, C is processed in L-bit sub-portions (hereinafter denoted "rows"), and to this purpose is represented as an [N×L] matrix of N rows and L columns (that is, L bits per row), with reads and updates being performed on L-bit rows. Any amount of client data C may be processed; if a row of C is not a multiple of L bits, it may be padded to a multiple of L bits before being processed. In some embodiments, N and L need not be the same for all items of data being securely stored (e.g., files), but rather are adjustable parameters that may vary for each data item.

The secure distribution module 205 distributes the data of C across K secure storage servers 101 (2 k=K>=4), with obfuscation, so that no single secure storage server 101 has the entire data of C in original (non-obfuscated) form.

Specifically, in one embodiment, the set of servers 101 is split in two groups of equal size k, where k>=2. The secure distribution module 205 sends, to each of the k servers (denoted with index j) in each of the two groups (denoted with index i), an obfuscated portion of the bits of C, the obfuscated portion denoted $R_{ij}$, and having the same size as C itself (i.e., N×L bits). To achieve this, $R_{1j}$ is initialized to random bits (i.e., a randomly-selected 0 or 1 bit, for each of the (N×L) bits), and $R_{2j}$ is initialized to a copy of $R_{1j}$. (Accordingly, by virtue of the XOR operation, the sum of $R_{1j}$ and $R_{2j}$ is the zero matrix.) For a fixed j, for j in 1 . . . k, each bit of C is added to $R_{xj}$ (that is, either to $R_{1j}$ or to $R_{2j}$, randomly selected). Put differently, for each bit of C, the bit is imprinted on R—that is, XOR'ed with the bit at the corresponding position of the selected R, and the result is stored at that position in that R. Imprinting all bits of C to a single R for a given j, or spreading them randomly over both Rs with the same j, are both permissible alternatives employed in different embodiments. The secure distribution module 205 sends $R_{ij}$ to all the servers 101 of the corresponding group i, such that each of the servers receives exactly one of the portions. The servers 101 store the portions $R_{ij}$ in an obfuscated portion repository 255, e.g., implemented as a database. (The term "obfuscated portion" is used for $R_{ij}$ in that each $R_{ij}$ is expected to reflect a portion of the data of C, and the random values to which the portion was initialized provide obfuscation.)

In another embodiment, in order to reduce the risk of collusion attacks, more than two server groups are used. Specifically, the set of servers 101 is split in g groups of size k, where g>=2 and k>=2. The g*k servers receive an obfuscated portion of the bits of C, the obfuscated portion denoted $R_{ij}$, and having the same size as C itself (i.e., N×L bits). For a fixed j, j in 1 . . . k, and for i in 1 . . . g−1, matrices $R_{ij}$ are independently initialized to random bits, and the remaining one of the $R_{ij}$ is initialized to the sum (bitwise XOR) of the other g−1 matrices $R_{ij}$. (Accordingly, by virtue of the XOR operation, the sum all $R_{ij}$ for a fixed j is the zero matrix.) For a fixed j, for j in 1 . . . k, each bit of C is added to $R_{xj}$ (where x is randomly chosen within the range 1 . . . g). Put differently, for each bit of C, the bit is imprinted on R—that is, XOR'ed with the bit at the corresponding position of the selected R, and the result is stored at that position in that R. Imprinting all bits of C to a single R for a given j, or spreading them randomly over all Rs with the same j, are both permissible alternatives employed in different embodiments.

In one embodiment, in order to prevent eavesdroppers on the network 140 from obtaining all the $R_{ij}$ (with the same j) and reassembling C based on them, an encryption module 225 of the client secure storage module 124 encrypts the portions before transmitting them to the secure storage servers 101. In order to achieve the appropriate isolation of the different secure storage servers 101, from each other, the $R_{ij}$ are encrypted differently for the different servers, such as using different cryptographic keys (e.g., different client-server pairs for symmetric key solution such as Kerberos, or a distinct public key per server for asymmetric key systems such as RSA, DSA, or elliptic curve systems, or distinct session keys using a transport layer-based protocol such as SSL). In some embodiments, the client secure storage module 124 sends a randomly-generated key along with each request (e.g., a read request for a data portion) sent to one of the secure storage servers 101, and the servers 101 use the respective randomly-generated key to encrypt the value (e.g., the data portion being read) that it sends back to the client device. The secure storage module 124 additionally comprises a secure read module 210 that obtains the original data of a specified row of C from the set of secure storage servers 101, such that none of the servers can determine which row is being obtained. Thus, not only do the servers 101 not know the actually data bits of the row being obtained (i.e., the data itself), but they additionally don't know which row is being obtained (i.e., the location of the data within C).

Specifically, for each read request, the secure read module 210 initializes k−1 random vectors $r_j$(j=1 . . . k−1), each having N random bits (i.e., each of the N bits is a 0 or 1 selected at random, N being the number of rows of C). Additionally, a vector $r_k$ is set to the bitwise sum (XOR) of the k−1 random vectors; accordingly, the bitwise sum of all k vectors $r_j$ (j=1 . . . k) is the zero vector.

The secure read module 210 encodes in k query vectors $q_j$ the index (denoted b) of the desired row. In one embodiment, in order to perform the encoding, the secure read module 210 randomly selects one of the k vectors $r_j$ and encodes b within that selected $r_j$. To do so, the vector $e_b$ is formed, $e_b$ being an all-zero vector of N bits, except for a bit set in the position of the vector corresponding to b (e.g., if b is 1, corresponding to the first row, $e_b$ has a 1 in the first element, and a 0 in the remaining N−1 elements). (It is appreciated that, in general, the choice of 0 or 1 as representing set/unset is not significant; equally, 1 could represent unset, and 0 could represent set.) To encode the desired row in the selected $q_j$, $e_b$ is bitwise added (XOR'ed) to the corresponding $r_j$. All other query vectors $q_j$ are simply a copy of the respective $r_j$. In other embodiments, $e_b$ may be added to any odd number of $r_j$s, rather than to only a single $r_j$; due to the nature of bitwise XOR, the result will be the same as if $e_b$ had been added to a single $r_j$, in that every pair of $e_b$ additions will cancel each other out.

The secure read module 210 sends each $q_j$ to the $j_{th}$ of the k servers 101 of group i, such that each server of this group receives exactly one of the vectors $q_j$. In one embodiment, the secure read module 210 performs encryption on the vectors $q_j$ before sending them to the servers 101, so as to prevent eavesdroppers from obtaining all the $q_j$ and bitwise adding them to obtain b, as represented by $e_b$.

Upon receiving the vector $q_j$ as part of the request for the row data, a query vector application module 260 of the corresponding secure storage server $S_{ij}$ $\mathbf{101}_{ij}$ of server group i computes a query result component $a_{ij}$, the product of the obfuscated portion $R_{ij}$ stored by $S_{ij}$ and the query vector $q_j$: When computing the matrix-vector product $R_{ij}*q_{ij}$, if the $m^{th}$ element of $q_{ij}$ is set, row m from $R_{ij}$ is selected, and all selected rows are summed up using XOR, resulting in the partial query result vector $a_{ij}$ with L bits:

$$a_{ij}=\Sigma_m(q_{ijm}*\text{row}_m(R_i))=q_{ij}^T*R_{ij} \text{ (matrix-vector product)}$$

The query vector application module 260 sends the computed partial query result vectors $a_{ij}$ back to the client secure read module 210. In one embodiment, in order to prevent eavesdroppers on the network 140 from obtaining all the $a_{ij}$ (of a group i) and reassembling the retrieved row based on them, the secure storage server $S_{ij}$ $\mathbf{101}_{ij}$ encrypts the result component $a_{ij}$ before transmitting it to the client secure storage 124. If SSL transport was used for the query, the encryption of SSL itself may be used for this purpose; alternatively, if the client device 120 provided the secure storage servers 101 with different randomly-generated keys, the servers 101 may use those keys when providing $a_{ij}$ back to the client device.

The client secure read module 210 accordingly obtains the $a_{ij}$ for each server $S_{ij}$. For a fixed j in the range 1 . . . k, the secure read module 210 computes $a_{ij}=\Sigma_i a_{ij}$, the bitwise sum (XOR) of all the received $a_{ij}$ for this j. Due to way in which the various $R_{ij}$ were computed, transformed, and distributed so as to securely represent C, the result of $a=\Sigma a_j$, which is computed by the secure read module 210, is the value of row b. Note that:

$$a_j=\Sigma_i a_{ij}=\Sigma_i R_{ij}*q_j=q_j^T*\Sigma_j R_i=q_j^T*C \text{ and therefore}$$

$$a=\Sigma_j a_j=\Sigma_j q_j^T*C=e_b^T*C=\text{row}_b(C)$$

That is, the original value of C is obtained from the combination of the obfuscated $R_{ij}$, and because the query vectors $q_i$ were selected to sum to $e_b$, $e_b$ can be used to select the desired row from the original data, C.

The client secure storage module 124 further comprises a secure update module 215 that allows a client device 120 to update a portion of the data C, as stored by the secure storage servers 101, to a new value, while preventing any of the servers 101 from determining which portion is being updated. Specifically, the secure update module 215 sets the value of a particular row of C with index b to a given value (i.e., set of L bits) while concealing the value of b from the servers 101.

In order to request the servers 101 on which C is securely stored to update the row b to a new value (set of bits) w, the secure update module 215 uses the secure read module 210 to obtain the current value (denoted v) of the row b as collectively securely stored by the servers 101.

The secure update module 215 computes an update delta value u as the bitwise sum (XOR) of the current value v and the desired value w (i.e., u=v+w).

The secure update module 215 then sends different update messages <t,u> to the two (or more, if thus configured) groups of servers. That is, the secure update module 215 initializes a vector r of N random bits (N being the number of rows in C). For each group i of k servers 101, the secure update module 215 generates a "randomized component" $t_i$, which is set either to the random vector r, or to the combination of r with the row ID vector $e_b$ (e.g., the bitwise sum of r and $e_b$). Specifically, $t_i$=r+$e_b$ for one of the groups, and $t_i$=r for the other groups; the group for which $t_i$=r+$e_b$ is selected at random. For each of the groups, the secure update module 215 sends an update message $m_i$=<$t_i$, u> to each of that group's k servers. The value $t_i$ (either r, or r+$e_b$) is referred to as a "randomized component". Thus, $e_b$ is not provided in original form, but rather as transformed by a random vector $t_i$, so the individual servers receiving the update messages cannot determine $e_b$ from $t_i$.

In one embodiment, in order to reduce the risk of collusion attacks, more than one group is sent the randomized component $t=r+e_b$, provided that the number of these groups is odd and the total number of groups is even. In case of the system having only two groups, exactly one group must receive a message containing $t=r+e_b$, as was explained above.

Upon receiving the messages $m=\langle t_i,u\rangle$ as part of the request to update the row b to value w, the secure storage servers 101 collectively replace the current value v in row b with the value w. To effect this replacement, a transformation module 565 of each of the secure storage servers 101 uses an outer product of the received update message t and update value u to imprint a server-specific mask on the obfuscated portion $R_{ij}$ already stored by the server, such that operation of the secure read module 220 will return the correct update value, w.

That is, the transformation module 565 computes and stores, instead of its current obfuscated portion $R_{ij}$, a transformation (denoted $R_{ij}'$) of $R_{ij}$ that factors in the values $t_i$ and u (the bitwise sum of v and w) received as part of the update message for group i. Specifically, the transformation module 265 computes the outer product of $t_i$ and u, which serves as a mask used to transform the stored obfuscated portion $R_{ij}$. The transformation module bitwise adds (XOR) the mask to $R_{ij}$. That is, $R_{ij}'=R_{ij}+(t_i \otimes u)$. The outer product is a [N×L] matrix U that is constructed by inserting a row at position m with value u each time the $m_{th}$ element of $t_i$ is set, or inserting a row of zeros otherwise. The transformation module 565 then saves $R_{ij}'$ in place of $R_{ij}$. (Note that the use of the various vectors $t_i$ prevents the identity of the row being transformed from being known to any of the individual servers 101, yet the identity of the row contributes to the transformation effected by at least one of the $t_i$s which then goes into the outer products $(t_i \otimes u)$).

Due to the design of the update transformations, when the client secure storage module requests the value of row b from the servers 101 via the secure read module 210, after the securely stored row b is updated by the secure updated module 215 to the value w, it will correctly receive w. Recall that retrieving a row from the system involves the construction of query vectors $q_j$ which apply to all servers at position j, in each of the i groups. Moreover, $a_j=q_j^T*C$. First consider retrieving one of the rows m that were not updated (but the $R_{ij}$ nevertheless changed). Because the number of groups is even, and the rows m of the $R_{ij}$ were either not modified at all ($t_m$ was not set) or $t_m$ was set and the value u had to be added to all rows, which cancel out each other because of the even group count, the value of $a_m$ remains the same:

$$a_m'=a_m \text{ when } m\neq b$$

Second, in the case where m is equal to b (index of the row that changed), the number of $R_{ij}$s to which u was added is odd: If the random vector r underlying t was not set at position b, an odd number of "special" $R_{ij}$s receive update u, by construction. If r was set at position b, because $e_b$ reverses this, $t_b$ is not set and an odd number of special $R_{ij}$s do not receive update u, which means that the number of $R_{ij}$s which receive update u is also odd as the number g of groups is even. Overall, when m equals b:

$$a_b'=a_b+n*u \text{ (where count } n \text{ is odd)}$$

which means $a_j'=a_j+u$ because of the XOR addition. Because u is the bitwise sum of v and w (i.e., u=v+w), and $a_j=v$ (old value), this results in $a_j'=v+u=v+(v+w)=w$. The final result $a=\Sigma_j a_j$ will also have value w because of the construction of the query vectors $q_j$ which select exactly the value at position b.

The client secure storage module 124 further comprises a fully secure update module 220 that allows a client device 120 to update a portion of the data C, as stored collectively by the secure storage servers 101, to a new value, while preventing any of the servers 101 from determining which portion is being updated, and while additionally preventing any of the servers 101 from even determining an update delta value that is added to effect the transform of the row data to the desired new value. Specifically, the fully secure update module 220 sets the value of a particular row with index b to a given value (i.e., set of L bits) while concealing the value of b from the servers 101, and while also concealing the value of an update delta u from the servers, thus providing confidentiality guarantees for all stored items and update values at all times.

In one embodiment, the update delta u can be made confidential by doubling the amount of servers 101 in the system. To this end, the fully secure update module 220 stores C distributed across two sets of g*k servers, and sends different update messages to the two sets of g*k servers, where g is the number of groups and k the size of the groups.

Specifically, to initially store C across the two sets of g*k servers, two matrices $C_1$ and $C_2$ are created, such that the bitwise sum $(C_1+C_2)=C$; for example, $C_1$ could be C and $C_2$ could be the 0-matrix, or any other distribution of the bits of C across $C_1$ and $C_2$ such that $C_1$ and $C_2$ sum to C. $C_1$ is stored by the secure distribution module 205 across one of the two sets of g*k servers, and $C_2$ is stored across the other set of g*k servers. In order to update the row of C as thus stored, the fully secure update module 220 initializes a vector p of L random bits (L being the number of bits in a row of C). The fully secure update module 220 uses the secure update module 215 to update row bin one set of the g*k servers 101 with the value (p+v), and the other set of the g*k servers with the value (p+w) for row b. Thus, the row update values sent as part of the update are always combined with a randomp, so that the true row update values are not determinable by the processing servers. The added degree of security afforded by also concealing the update delta u may in some contexts be considered worth the doubling of servers that are used by the secure update module 215, in that this also prevents possible reverse-engineering of the original value v or updated value w based on value u.

When the client secure storage module requests the value of row b from the two sets of servers 101 via the secure read module 210 and then adding them up (with bitwise XOR), after the securely stored row b is updated by the fully secure updated module 220 to the value w, it will correctly receive w. Assuming that before the update the first set of the servers stored $v_1$ and the second set of the servers stored $v_2$ at the position of interest such that $v_1+v_2=v$, then updating will lead to the first set of the servers storing $v_1+p+v$ and the second set of the servers storing $v_2+p+w$. Retrieving these two values and adding them up (with bitwise XOR) yields $a=(v1+p+v)+(v_2+p+w)=v+v+p+p+w=w$.

In one embodiment, the set of servers used to conceal the update value is at least doubled (in order to increase to effort necessary for servers 101 to collude). That is, if the secure update module 215 uses g*k servers 101 (where g is the number of server groups and k the size of each group), the fully secure update module 220 uses f*g*k servers, f>=2. The minimum configuration is 8 servers, since the secure update module 215 uses at least 4 servers (g=k=2).

The fully secure update module 220 performs two operations: The first operation is to initialize f−1 rows with random bits and one row with their sum such that when adding them all up results in a row of zeros; the second operation is to spread the bits of w and v over the f rows and adding them with XOR at the corresponding position. These f rows will be used to update each of the f sets independently. Because all these f rows will be summed up in the retrieval phase, the overall sum will be the old content of the f rows plus the value v+w, which is the update value u. In other words, all distribution of the update value to f rows is undone at the client device 120A. It is appreciated that there are many ways of distributing the bits of w and v: fully randomly, regularly (e.g. the first bit of w to row 1, second bit of w to row 2 etc. and restarting at row 1 after reaching the f+1 bit of w), or w fully in one row and v spread over all other rows, and the like.

The use of the fully secure update module 220, relative to the secure update module 215, additionally addresses the problem of preventing the value of the update delta from being determined, but uses double the number of servers 101. Alternatively, in some embodiments in which all the client devices 120 that access given data stored on the secure servers can obtain a shared key, the shared key is used to encrypt the update delta value so that the servers 101 cannot determine it. This avoids the need for doubling the number of servers 101 to provide the obfuscation of the update delta value via the common random vector p; for example, in one embodiment only the same number of servers 101 used by the secure update module 315 is required, plus a (possibly distinct) server to distribute a shared key to all the client devices 120 that are authorized to view the data in question. In these embodiments, the operation of the secure update module 215 is modified to encrypt the update value, w, using the key, resulting in the encrypted value $w_e$. Since the row values are stored in encrypted form in this embodiment, the read of the current row value as performed by the secure read module 210 is $v_e$, the encrypted form of the original value. The update messages sent to the servers then include, as the update delta value, the bitwise sum (XOR) of the encrypted versions of the old and new values—that is, u' is the value included in the update messages sent to the servers, where $u'=v_e+w_e$.

In an alternative embodiment of the fully secure update module 220, only the g*k servers of the secure update module 315 are used (instead of the f*g*k servers of the above-described embodiment), with per-row shared keys being stored in the g*k servers themselves without the need for additional key servers, and without the need for key distribution or storage of keys in the client devices 120. In this embodiment, the security depends on the quality of the encryption algorithm that uses the keys. More specifically, the content of each row is extended by two fields, s and r. In case of a symmetric encryption algorithm, the first field (s) serves as the seed for an encryption key, and the second field (r) is a pool of random bits. Initialization differs from the initialization of the g*k servers discussed above in that it prepares a wider content matrix C' from of C as follows: For each row c of C, two fields of fixed width (i.e., s and r) are filled with random bits to which the encrypted form of the content row c is appended, i.e. s|r|enc(c), where "|" denotes appending, and enc(c) denotes the encrypted value of c. (It is appreciated that any other order of combining s, r, and enc(c) would also work, provided that a mechanism is available to separate the appended fields.) An encryption key is derived from the first field s, optionally also using (depending on the properties of the chosen encryption algorithm) a portion of the second field r. This key, together with the other portion of the second field (that can serve as initialization vector, for example), is used to encrypt the original data row c and this ciphertext enc(c) used in C'. The matrix C' is then distributed to the g*k servers as before. Information retrieval is accomplished by securely retrieving an expanded row, extracting from it the key seed and the second field r, deriving from them the decryption key, and decrypting the bits that follow the two fields. Update is implemented by first securely retrieving the old content of the expanded row, assigning new random bits to the second field r', encrypting the new data $c_{new}$ and forming a new expanded row s|r'|enc'($c_{new}$) as described for the initialization, and then updating the g*k servers with the XOR between the retrieved old expanded row and the new expanded row. Note that none of the g*k servers ever obtains the key used to encrypt the row's content, the key seed, the old data value, or the new data value. Rather, the servers only obtain the XOR differences of the ciphertexts and the (random) change of the second field r. The random bits r ensure that each update results in a different bit pattern (via new derived key and fresh initialization vector, for example). In one embodiment using AES and SHA256, for example, the first field (key seed) is 256 bits long, to which 128 bits from the second field are appended before hashing them, and this hash is used as key together with another 128 bits, also from the second field, as the initialization vector for this row.

FIGS. 3A-3D illustrate the interactions between a client device 120A and the various secure storage servers 101 as part of the various operations described above with respect to the modules of FIGS. 2A and 2B.

Figure 3A:
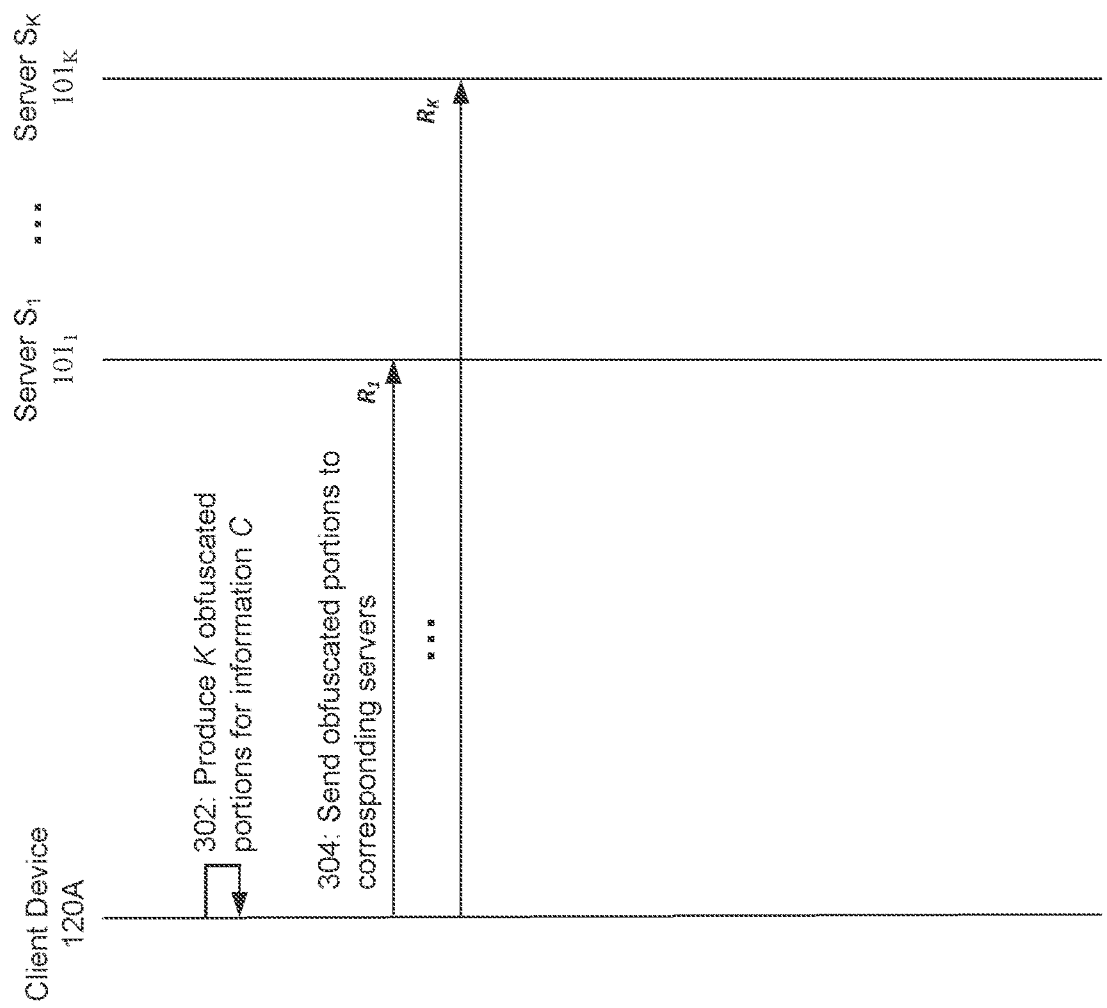
FIGS. 3A-3D illustrate the interactions between a client device and the various secure storage servers as part of the various operations described above with respect to the modules of FIG. 2B.

FIG. 3A illustrates the interactions between a client device 120A and the secure storage servers 101 as part of the secure distribution of the data C, according to one embodiment.

The secure distribution module 205 of the client device 120A produces 302 a set of K obfuscated portions $R_i$ (e.g., N rows of L bits each) and sends 304 the obfuscated portions to the corresponding K secure storage servers 101. Each secure storage server $S_i$ 101 stores its received obfuscated portion R in its obfuscated portion storage 255.

Figure 3B:
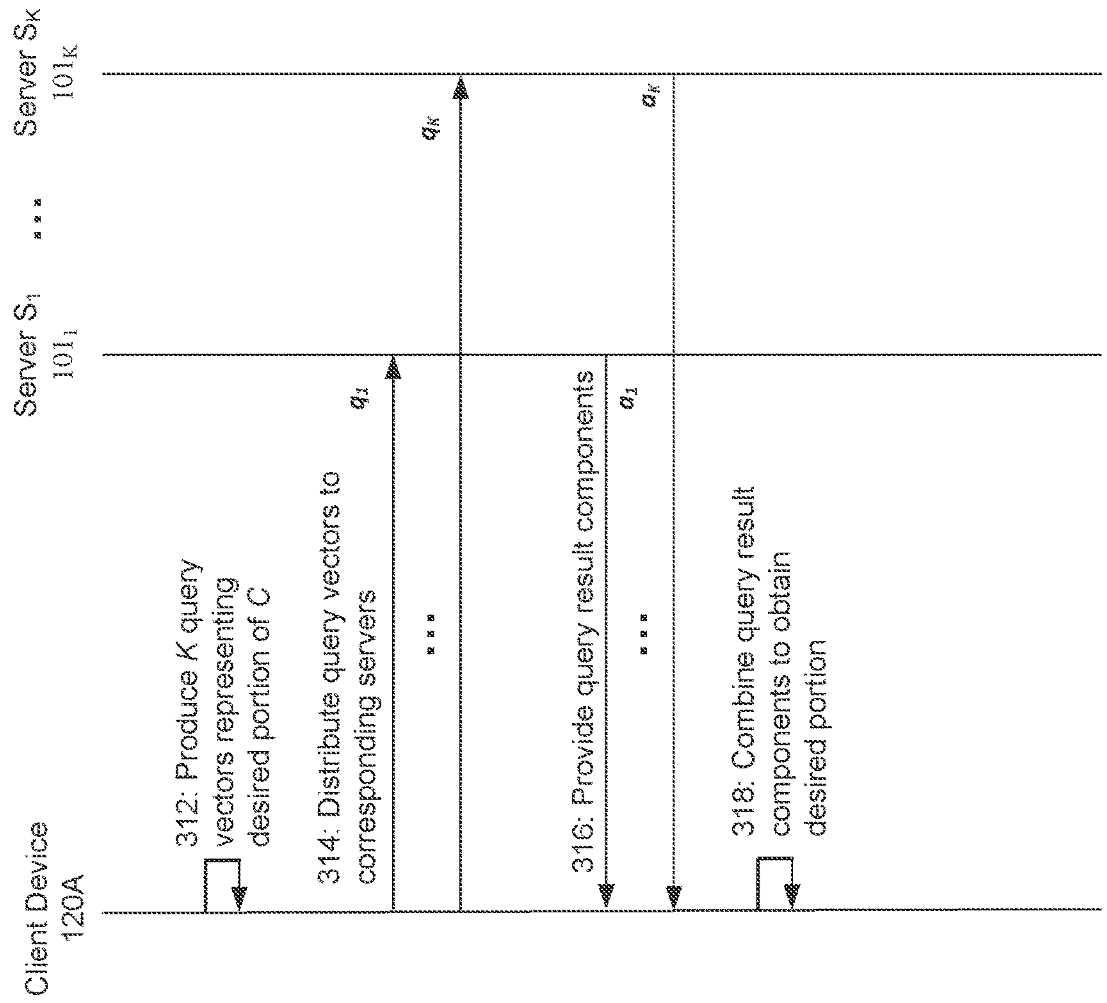

FIG. 3B illustrates the interactions between a client device 120A and the secure storage servers 101 as part of the secure data reading of a given row of data securely stored on the K servers 101, according to one embodiment.

The secure read module 210 of the client device 120A produces 312 a set of K query vectors $q_i$, that collectively represent the row b whose value is desired, but with randomization such that no individual query vector reveals the identity of the row b. The secure read module 210 distributes 314 the query vectors to the corresponding secure storage servers $S_i$ 101, as described above with respect to the secure read module 210.

Each server 101 computes a query result component $a_i$, as described above with respect to the query vector application module 260, and provides 316 the $a_i$ to the secure storage module 124 of the client device 120A.

The secure storage module 124 combines 318 the query result components $a_i$ using a bitwise sum to derive the desired portion: v, the present value of the row b.

Figure 3C:
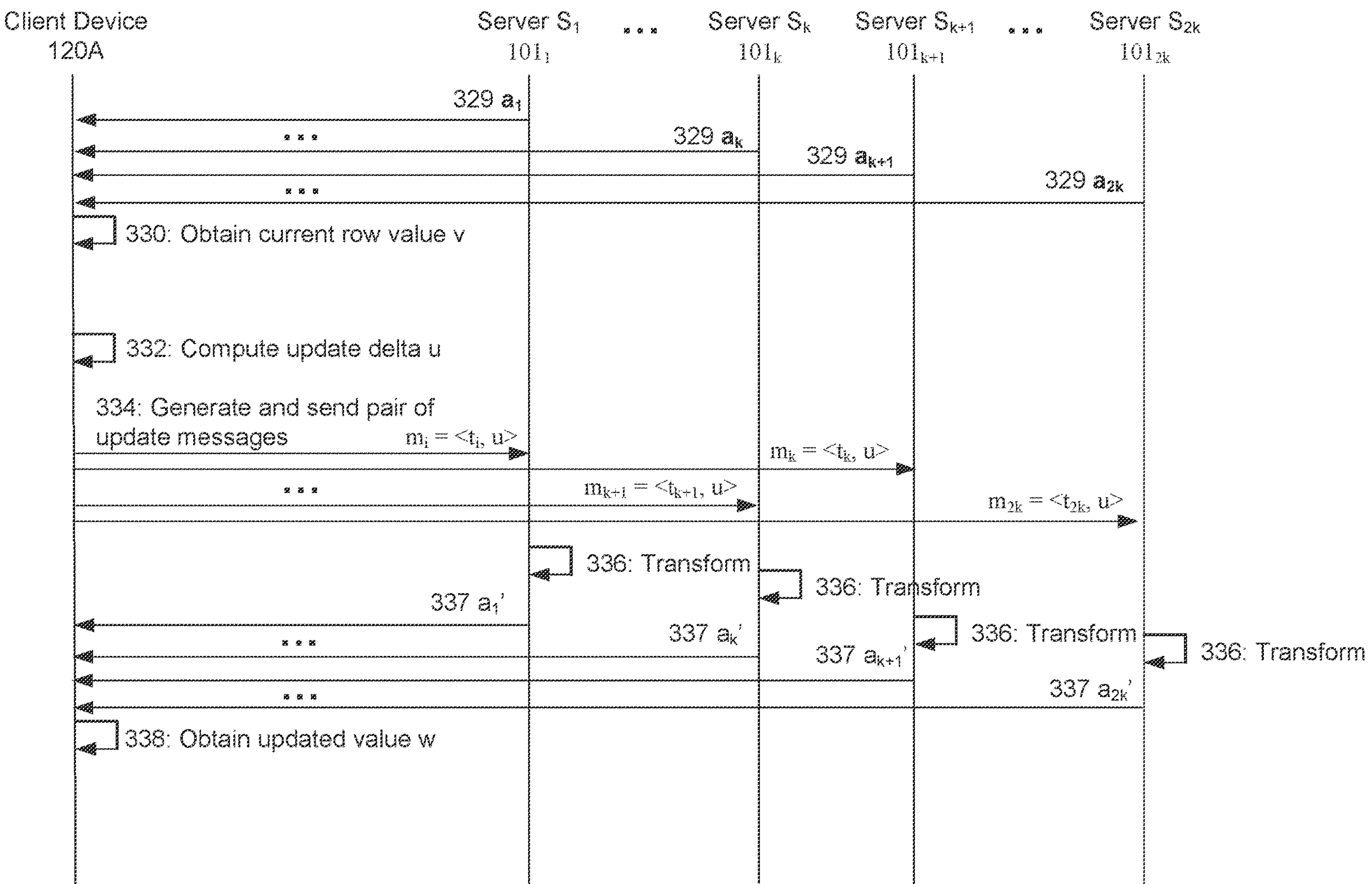

FIG. 3C illustrates the interactions between a client device 120A and the secure storage servers 101 as part of the secure update of a given row for g=2 groups of servers, according to one embodiment.

FIG. 3C assumes that the data C has already been distributed to the 2 k servers by the secure distribution module 205.

The secure storage module 124 of the client device 120A obtains 330 the current value, v, of the given row to be updated (b) using the secure read module 210 (which involves obtaining 329 the partial query result vectors $a_i$), as illustrated by FIG. 3B.

The secure storage module 124 computes 332 the update delta value, u, and a set of randomized components t, and generates 334 and sends different update messages containing <t, u> to the two halves of the 2 k servers, as described above with respect to the secure update module 215.

Each server $S_i$ 101 that receives an update message uses its transformation module 565 to transform its current stored obfuscated portion of C, $R_j$, using a mask based on the t and u values from the provided update message data. When taken across the set of servers 101 as a whole, this represents the updating of the desired row b to value w, without any given server 101 being able to determine which row b was updated due to the use of the randomized components t to obfuscate the row (though each server does at least know the update delta value u).

At step 338, in response to secure reading of the value of the row b by the client device 120A (as illustrated by FIG. 3B), the client device 120A obtains the value w by adding together the transformed partial query result vectors $a_i'$ obtained in step 337.

Figure 3D:
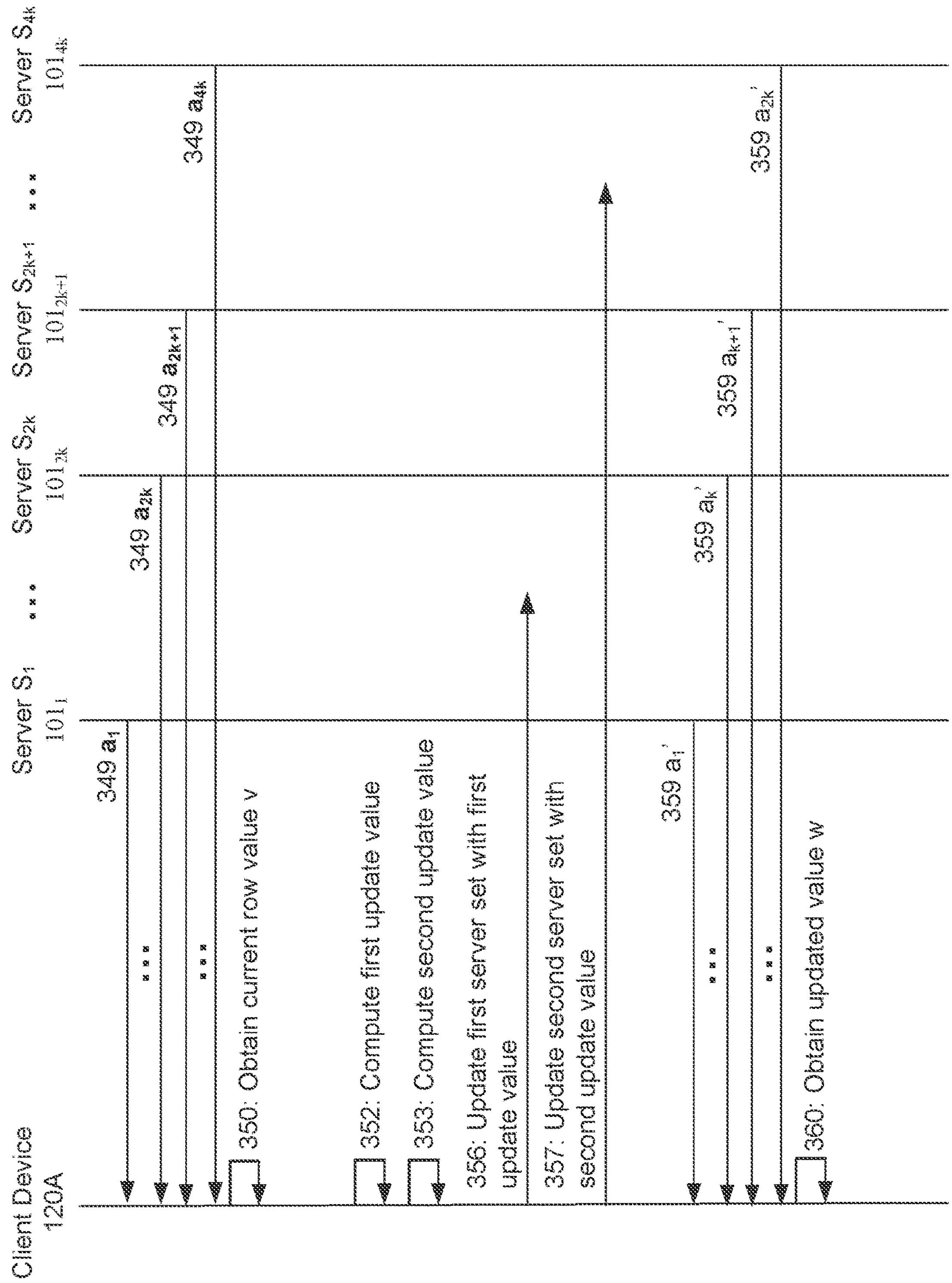

FIG. 3D illustrates the interactions between a client device 120A and the secure storage servers 101 as part of the fully secure update of a given row, according to one embodiment.

FIG. 3D assumes that the data C has already been distributed to the 4 k servers by the secure distribution module 205.

The secure storage module 124 of the client device 120A obtains 350 the current value, v, of the given row to be updated (b) using the secure read module 210, as illustrated by FIG. 3B. This involves obtaining 349 the partial query result vectors $a_i$.

The secure storage module 124 computes 352 a first update value, $u_1=(p+v)$, and computes 353 a second update value, $u_2=(p+w)$, and then uses the secure update module 215 to update 356 the row b of half of the servers 101 with the first update value and to update 357 the row b of the other half of the servers with the second update value, as described above with respect to the secure update module 215. (That is, in terms of FIG. 3C, steps 332, 334, and 336 are performed for the two halves of the server set when implementing steps 356 and 357 of FIG. 3D, where the update delta u is the first update value (p+v) for one half, and the second update value (p+w) for the other half.) No server 101 in isolation can compute either the row b, or the new value w to which it is to be updated, from the messages specifying the updates.

As a consequence of the way in which the updating of steps 352-357 is performed, when the secure storage module 124 uses the secure read module 210 to obtain 360 the current value by querying the 4 k servers, it obtains the value w to which row b was securely updated.

It is appreciated that the particular order of operations described in FIGS. 3A-3D could be varied in different embodiments.

Example Uses

The use of the client secure storage module 124 and the secure storage servers 101 permit storage of client data on the servers (e.g., as cloud storage) in a manner that maintains privacy of the data, both with respect to the servers and to other parties, such as network eavesdroppers. The data stored may be of any type, such as messages, trade secrets (e.g., source code or business plans), images, and/or documents.

For example, a user wishing to share the source code for his computer program with other members of his team can securely store the code on the servers and make the credentials required to access it available to his team, such that his team can read and update the code, but none of the servers can determine the contents of the code, nor can a third party snooping on the network.

For another example, a family sharing its contacts in the cloud can use the service to retrieve and update the database without the servers being able to see which contact is looked up most frequently, which contacts recently changed their addresses and whom a contact represents.

For another example, social networking communication can be offered where the servers cannot deduce who has read the posts from whom and who added a comment to what message.

Example Operations for Secure Data Storage

Figure 4:
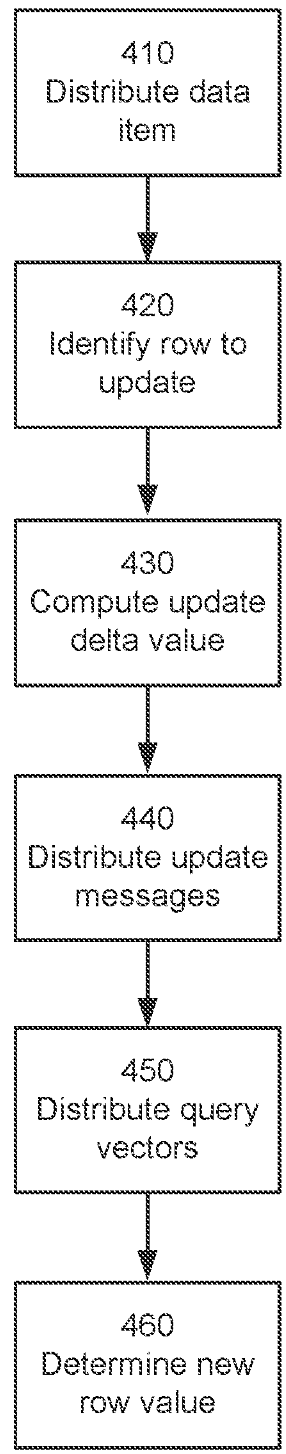
FIG. 4 is a flow chart illustrating operations involved in distributing and updating a data item and reading the updated data item, according to one embodiment.

FIG. 4 is a flow chart illustrating operations involved in distributing and updating a data item and reading the updated data item, according to one embodiment. The operations illustrated in FIG. 4 are performed by a source computer (e.g., the client devices 120 of FIG. 1), which can represent any computer system that uses the secure storage servers 101 to achieve secure data storage; this may include a computer system that includes server functionality of its own. Other embodiments may perform the steps in different orders and/or include additional or different steps.

In step 410, the source computer distributes a data item C to a plurality of secure storage servers 101, as discussed above with respect to the secure distribution module 205 of FIG. 2A and the operations of FIG. 3A. The data item C may be, for example, source code or another document containing a trade secret or other private or confidential information. The data item C is distributed to the servers 101 such that each of the plurality of servers stores some (that is, a proper subset of) the data of the data item, due to the way in which the bits of C are randomly distributed among the obfuscated portions $R_{ij}$ of the different servers 101. Each of the servers 101 receives an obfuscated portion $R_{ij}$ of same [N×L] number of bits as C, each obfuscated portion being initialized to random bits and including some of the bits of C imprinted into it.

In step 420, the source computer identifies a row of the data item—that is, a sub-portion of L bits of the data item—to be updated from a current value to a new value. For example, if the data item is a bitmap image securely stored on the servers 101 but read and edited locally on the source computer, and a user locally edits the bitmap image to change the colors of one of the pixels, and then indicates that the revised bitmap image should be securely updated, image editing software executing on the source computer could identify the changed pixel of the bit image, and correspondingly identify which row of the bitmap image data that pixel corresponds to.

In step 430, the source computer computes an update delta value for the row based on the current value of the row (which includes the bits encoding the color value of the pixel stored before the pixel color was changed) and the new value of the row (which includes the bits encoding the color value of the pixel after the pixel color was changed). For example, the update delta value can be the bitwise sum of the current and new values of the row.

In step 440, the source computer distributes update messages to the plurality of servers that cause the servers collectively to update the value of the row from the current value to the new value by updating their corresponding stored obfuscated portions $R_{ij}$, as described above with respect to the secure update module 215 and the operations of FIG. 3C. This includes the forming of the messages $m=<t_i,u>$, where the $t_i$ values introduce random bits that obfuscate the identity of the row being updated, such that the row is not derivable from any given one of the update messages, and hence is not known to any given one of the servers 101 that receives a given one of the update messages or to eavesdroppers on the network 140 that obtain one of the update messages. Rather, the application of the mask generated from the outer product of $t_i$ and u, when performed by all of the involved servers 101, collectively causes the update of the row in question.

In step 450, after the update of step 440, the source computer (or another source computer that is authorized to read the data item) requests the updated value of the row. For example, the source computer may re-load the file for the data item at some later time and request the updated value of the row (and of the other rows of the data item) from the servers 101. To obtain the updated value of the row, the source computer generates and distributes a plurality of query vectors to the servers 101, as described above with respect to the secure read module 210 and the operations of FIG. 3B. The query vectors collectively identify the row to be read such that the row is not derivable from any given one of the query vectors, due to the initialization of the query vectors to random bits so as to obfuscate the row ID that is imprinted on one of (or, more generally, an odd number of) the query vectors.

In step 460, the source computer determines the new (updated) value of the row in question using the partial query result vectors $a_{ij}$ that the servers 101 send back in response to receiving the query vectors, as described above with respect to the secure read module 210 and the operations of FIG. 3B.

Example Computer Architecture

Figure 5:
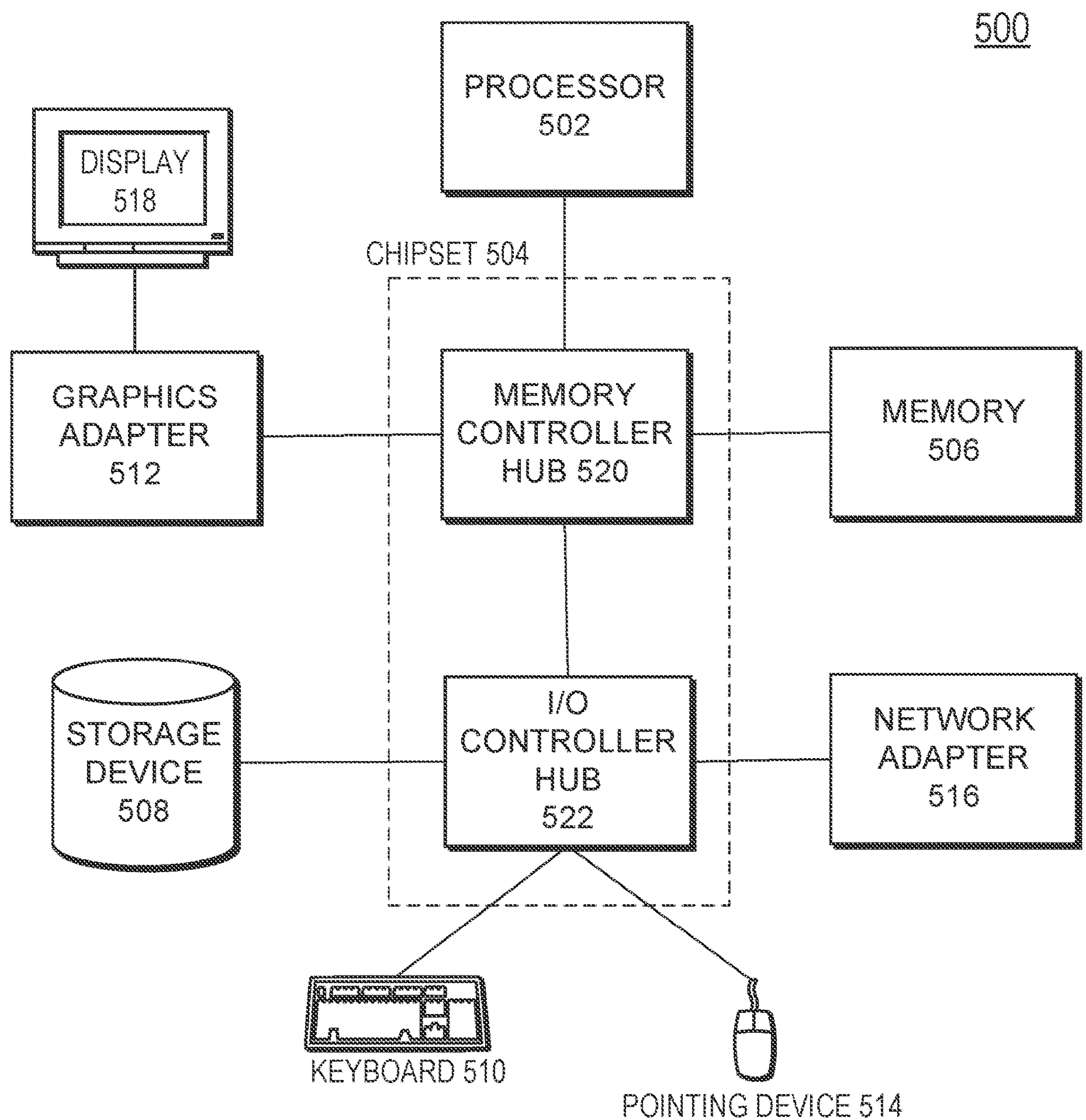
FIG. 5 is a high-level block diagram illustrating physical components of a computer used as part or all of the communication server, organization system, or client device from FIG. 1, according to one embodiment.

FIG. 5 is a high-level block diagram illustrating physical components of a computer 500 used as part or all of the secure storage servers 101 or client devices 120 from FIG. 1, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD (Digital Versatile Disc), or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:

initializing a plurality of obfuscated portions to random bit values such that a sum of two of the plurality of obfuscated portions is zero;

distributing bits of a data item among the plurality of obfuscated portions, wherein each of the plurality of obfuscated portions includes a subset of content of the data item, wherein the data item and the plurality of obfuscated portions comprise bit matrices in which each matrix element is a bit, and wherein the bit matrices of the data item and the plurality of obfuscated portions are equal in size; and distributing the obfuscated portions from a source computer to a plurality of servers, wherein each of the servers stores a respective obfuscated portion from the plurality of obfuscated portions, and wherein the source computer and the plurality of servers are configured to communicate using a set of parallel request-response operations.

2. The method of claim 1, further comprising:

distributing to the servers a plurality of query vectors in which each vector element is a bit, the query vectors collectively identifying a sub-portion of the data item, wherein the sub-portion is not derivable from any given one of the query vectors, and wherein distributing the plurality of query vectors comprises sending to each server from the plurality of servers a respective query vector from the plurality of query vectors; and determining a value of the sub-portion using a plurality of query result vectors received from the plurality of servers in response to the plurality of query vectors, wherein determining the new value comprises combining the plurality of query result vectors.

3. The method of claim 2, wherein the sub-portion is a row of the data item.

4. The method of claim 2, wherein each query vector comprises one element for each row of the data item.

5. The method of claim 2, wherein each query result vector in the plurality of query result vectors comprises a matrix-vector product of (i) a query vector from the plurality of query vectors and (ii) an obfuscated portion from the plurality of obfuscated portions.

6. The method of claim 2, wherein determining the value of the sub-portion comprises computing a bitwise sum of the query result vectors.

7. The method of claim 1, further comprising:

identifying a row of the data item to update from a current value to a new value;

computing an update delta value for the row of the data item based on the current value and the new value; and distributing update messages based on the update delta value to the plurality of servers, the update messages causing the plurality of servers to update the corresponding plurality of obfuscated portions stored by the servers using the update delta value so as to update the current value of the row from the current value to the new value, the update messages collectively indicating the row to update such that the row is not derivable from any given one of the update messages.

8. The method of claim 7, wherein distributing update messages based on the update delta value comprises:

for each server from the plurality of servers:

generating a randomized component;

generating an update message comprising the randomized component and the update delta value; and sending the generated update message to the respective server from the plurality of servers.

9. The method of claim 8, wherein the randomized component is either a vector of random bits, or a combination of a vector of random bits with a vector representing a row index of the row.

10. A system comprising:

one or more computer processors and one or more hardware storage devices storing instructions that are operable, when executed by the one or more computer processors, to cause the one or more computer processors to perform operations comprising:

initializing a plurality of obfuscated portions to random bit values such that a sum of two of the plurality of obfuscated portions is zero;

distributing bits of a data item among the plurality of obfuscated portions, wherein each of the plurality of obfuscated portions includes a subset of content of the data item, wherein the data item and the plurality of obfuscated portions comprise bit matrices in which each matrix element is a bit, and wherein the bit matrices of the data item and the plurality of obfuscated portions are equal in size; and distributing the obfuscated portions from a source computer to a plurality of servers, wherein each of the servers stores a respective obfuscated portion from the plurality of obfuscated portions, and wherein the source computer and the plurality of servers are configured to communicate using a set of parallel request-response operations.

11. The system of claim 10, the operations further comprising:

distributing to the servers a plurality of query vectors in which each vector element is a bit, the query vectors collectively identifying a sub-portion of the data item, wherein the sub-portion is not derivable from any given one of the query vectors, and wherein distributing the plurality of query vectors comprises sending to each server from the plurality of servers a respective query vector from the plurality of query vectors; and determining a value of the sub-portion using a plurality of query result vectors received from the plurality of servers in response to the plurality of query vectors, wherein determining the new value comprises combining the plurality of query result vectors.

12. The system of claim 11, wherein the sub-portion is a row of the data item.

13. The system of claim 11, wherein each query vector comprises one element for each row of the data item.

14. The system of claim 11, wherein each query result vector in the plurality of query result vectors comprises a matrix-vector product of (i) a query vector from the plurality of query vectors and (ii) an obfuscated portion from the plurality of obfuscated portions.

15. The system of claim 11, wherein determining the value of the sub-portion comprises computing a bitwise sum of the query result vectors.

16. The system of claim 10, the operations further comprising:

identifying a row of the data item to update from a current value to a new value;

computing an update delta value for the row of the data item based on the current value and the new value; and distributing update messages based on the update delta value to the plurality of servers, the update messages causing the plurality of servers to update the corresponding plurality of obfuscated portions stored by the servers using the update delta value so as to update the current value of the row from the current value to the new value, the update messages collectively indicating the row to update such that the row is not derivable from any given one of the update messages.

17. The system of claim 16, wherein distributing update messages based on the update delta value comprises:

for each server from the plurality of servers:

generating a randomized component;

generating an update message comprising the randomized component and the update delta value; and sending the generated update message to the respective server from the plurality of servers.

18. A storage device comprising:

a non-transitory, computer-readable storage medium storing instructions that when executed by one or more computer processors perform actions comprising:

initializing a plurality of obfuscated portions to random bit values such that a sum of two of the plurality of obfuscated portions is zero;

distributing bits of a data item among the plurality of obfuscated portions, wherein each of the plurality of obfuscated portions includes a subset of content of the data item, wherein the data item and the plurality of obfuscated portions comprise bit matrices in which each matrix element is a bit, and wherein the bit matrices of the data item and the plurality of obfuscated portions are equal in size; and distributing the obfuscated portions from a source computer to a plurality of servers, wherein each of the servers stores a respective obfuscated portion from the plurality of obfuscated portions, and wherein the source computer and the plurality of servers are configured to communicate using a set of parallel request-response operations.

* * * * *